United States Patent
Nomura et al.

(10) Patent No.: US 11,353,341 B2
(45) Date of Patent: Jun. 7, 2022

(54) DETECTION DEVICE AND ASSISTANT ROBOT

(71) Applicant: FUJI CORPORATION, Chiryu (JP)

(72) Inventors: Hideaki Nomura, Chiryu (JP); Joji Isozumi, Chiryu (JP)

(73) Assignee: FUJI CORPORATION, Chiryu (JP)

(*) Notice: Subject to any disclaimer, the term of this patent is extended or adjusted under 35 U.S.C. 154(b) by 1308 days.

(21) Appl. No.: 15/556,795

(22) PCT Filed: Mar. 9, 2015

(86) PCT No.: PCT/JP2015/056849
§ 371 (c)(1),
(2) Date: Sep. 8, 2017

(87) PCT Pub. No.: WO2016/143039
PCT Pub. Date: Sep. 15, 2016

(65) Prior Publication Data
US 2018/0052014 A1    Feb. 22, 2018

(51) Int. Cl.
| | |
|---|---|
| *G01D 5/249* | (2006.01) |
| *G01D 5/245* | (2006.01) |
| *A61G 5/00* | (2006.01) |
| *A61G 7/10* | (2006.01) |
| *B25J 11/00* | (2006.01) |

(52) U.S. Cl.
CPC .............. *G01D 5/249* (2013.01); *A61G 5/00* (2013.01); *A61G 7/1017* (2013.01); *A61G 7/1019* (2013.01); *B25J 11/009* (2013.01); *G01D 5/2457* (2013.01); *A61G 2203/30* (2013.01); *A61G 2203/40* (2013.01)

(58) Field of Classification Search
CPC ......... A61G 5/00; G01D 5/249; G01D 5/2457
See application file for complete search history.

(56) References Cited

U.S. PATENT DOCUMENTS

| | | | | |
|---|---|---|---|---|
| 4,796,005 A | * | 1/1989 | Ishida | ............... G01D 5/24404 318/603 |
| 5,920,171 A | * | 7/1999 | Kim | .................... G01D 5/2457 318/568.16 |

FOREIGN PATENT DOCUMENTS

JP          8-292067 A     11/1996

OTHER PUBLICATIONS

International Search Report dated Apr. 7, 2015 in PCT/JP2015/056849 filed Mar. 9, 2015.

* cited by examiner

*Primary Examiner* — Reena Aurora
(74) *Attorney, Agent, or Firm* — Oblon, McClelland, Maier & Neustadt, L.L.P.

(57) ABSTRACT

A detection device which detects a state of a moving member such as an origin position of the moving member in a short time, is provided with a dog which includes the multiple slits, in which at least one of a separation distance between adjacent slits and a width of the slits themselves is formed in multiple kinds, a sensor which detects the presence or absence of the slits, a count position acquisition section which acquires a count start position and a count end position corresponding to the separation distance between the adjacent slits or the width of the slits themselves based on detection results of the sensor, and a state detection section which acquires a count value increase or decrease number from the count start position to the count end position and detects a state of the moving member based on the acquired count value increase or decrease number.

7 Claims, 13 Drawing Sheets

Fig. 8
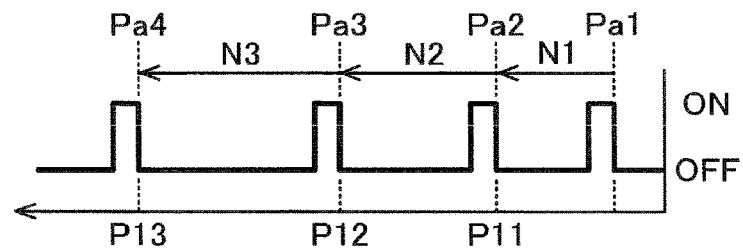
Fig. 9
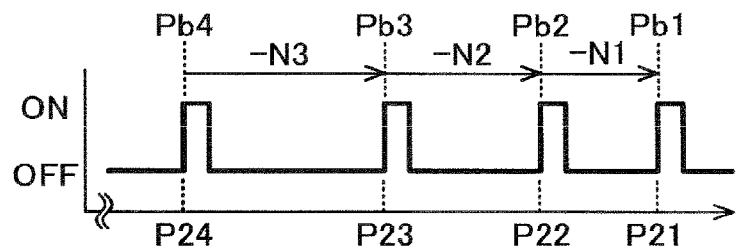
Fig. 10
| Ps: COUNT START POSITION | Pe: COUNT END POSITION | COUNT VALUE INCREASE OR DECREASE NUMBER |
|---|---|---|
| Pa1 | Pa2 | N1 |
| Pa2 | Pa3 | N2 |
| Pa3 | Pa4 | N3 |
| ⋮ | ⋮ | ⋮ |
| Pb2 | Pb1 | −N1 |
| Pb3 | Pb2 | −N2 |
| Pb4 | Pb3 | −N3 |
| ⋮ | ⋮ | ⋮ |

Fig. 11

| COUNT VALUE INCREASE OR DECREASE NUMBER | CURRENT POSITION | CUMULATIVE COUNT VALUE |
|---|---|---|
| N1 | P11 | NA11 |
| N2 | P12 | NA12 |
| N3 | P13 | NA13 |
| . | . | . |
| . | . | . |
| − N1 | P21 | NA21 |
| − N2 | P22 | NA22 |
| − N3 | P23 | NA23 |
| . | . | . |
| . | . | . |

DETECTION DEVICE AND ASSISTANT ROBOT

TECHNICAL FIELD

The present application relates to a detection device which detects the state of a moving member using an incremental encoder and an assistant robot which is provided with the detection device.

BACKGROUND ART

In a case in which positional control of a moving member is performed using an incremental encoder, it is known to use a cumulative value of a count value from an origin. In order to reliably detect the origin position, PTL 1 describes clearing the count value of the incremental encoder (an origin return operation) in a case in which the moving member is positioned at the origin. It is assumed to be possible to prevent the occurrence of a cumulative error of the detection value due to the origin return operation.

CITATION LIST

Patent Literature

PTL 1: JP-A-8-292067

SUMMARY

Technical Problem

However, since it is necessary to move the moving member from the current position to the origin, in a case in which the current position is separated from the origin, time may be required for the origin return operation.

An object of the present disclosure is to provide a detection device which is capable of detecting the state of a moving member such as an origin position of the moving member in a short time and an assistant robot which is provided with the detection device.

Solution to Problem

A detection device includes a reference member, a moving member which moves relative to the reference member, an incremental encoder which increases or decreases a count value each time the moving member moves relative to the reference member by a predetermined amount, a driving source which drives relative movement between the reference member and the moving member based on the count value of the incremental encoder, a dog which is disposed on one of the reference member and the moving member and which includes multiple slits, in which at least one of a separation distance between adjacent slits and a width of the slits themselves varies, a sensor which is disposed on the other of the reference member and the moving member and detects presence or absence of the slits, a count position acquisition section which acquires a count start position and a count end position corresponding to the separation distance between the adjacent slits or the width of the slits themselves based on detection results of the sensor in a case in which the moving member moves relative to the reference member, and a state detection section which acquires a count value increase or decrease number from the count start position to the count end position in the space between the adjacent slits or the width of the slits themselves based on detection results of the sensor and the count value and detects the state of the moving member based on the acquired count value increase or decrease number in a case in which the moving member moves relative to the reference member.

According to the detection device, the dog is provided with the multiple slits, multiple kinds of the separation distances between the adjacent slits are set, multiple kinds of the widths of the slits themselves are set, or multiple kinds of both the separation distances between the adjacent slits and the widths of the slits themselves are set. Multiple kinds of the interval from the count start position to the count end position which are acquired by the count position acquisition section are present. Therefore, the count value increase or decrease number which is acquired by the state detection section is a number corresponding to multiple kinds of separation distance between the adjacent slits, or, a number corresponding to the width between the slits themselves. Therefore, it is possible to detect the state of the moving member in a short time by the moving member moving only a little with respect to the reference member.

A first assistant robot includes a base, a lifting and lowering section which is lifted and lowered with respect to the base, a lifting and lowering arm which connects the base to the lifting and lowering section and is configured by multiple arm members which move relatively, a holding section which holds a portion of a body of a person in need of assistance and is disposed on the lifting and lowering section, and the detection device, in which the reference member and the moving member are the multiple arm members which move relatively in the lifting and lowering arm. According to the first assistant robot, it is possible to detect the state of the multiple arm members which move relatively in the lifting and lowering arm in a short time.

A second assistant robot includes a base, a lifting and lowering section which is lifted and lowered with respect to the base, a lifting and lowering arm which connects the base to the lifting and lowering section, a holding section which holds a portion of a body of a person in need of assistance and moves forward and backward with respect to the lifting and lowering section, and the detection device, in which the reference member and the moving member are the lifting and lowering section and the holding section. According to the second assistant robot, it is possible to detect the state of the holding section with respect to the lifting and lowering section in a short time.

BRIEF DESCRIPTION OF DRAWINGS

FIG. 8 is detection results of a sensor in a case in which the moving member moves to one side with respect to the reference member.

FIG. 9 is detection results of the sensor in a case in which the moving member moves to another side with respect to the reference member.

FIG. 10 is information which is obtained by a count position acquisition section and a count value increase or decrease number acquisition section which configure a control device of FIG. 7.

FIG. 11 is relationship data which is stored in a relationship data memory section of the control device of FIG. 7.

FIG. 18 corresponds to a sectional view along 18-18 of FIG. 19.

DESCRIPTION OF EMBODIMENTS

Figure 1:
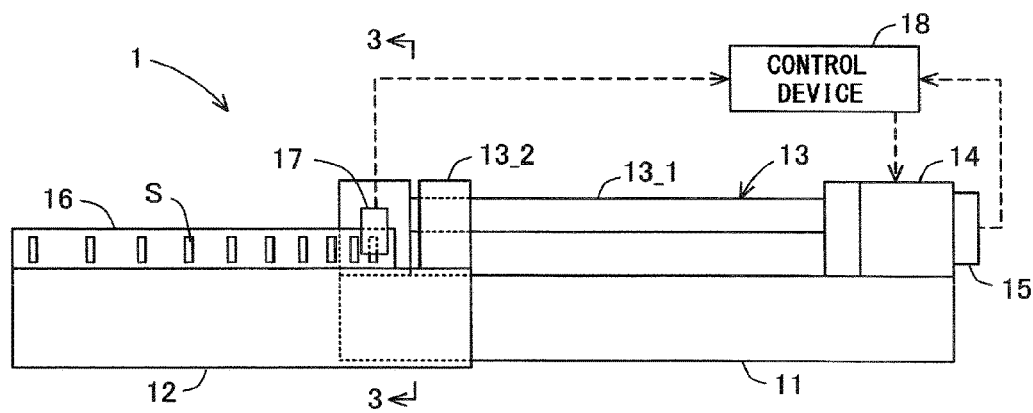
FIG. 1 is a configuration diagram of a detection device of a first embodiment.
Figure 2:
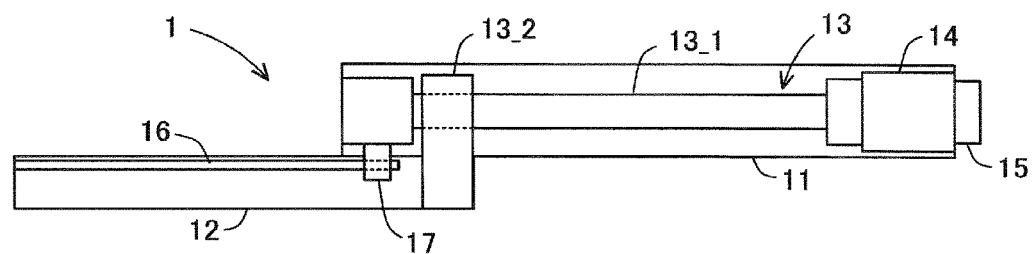
FIG. 2 is a view of the detection device of FIG. 1 as viewed from above.
Figure 3:
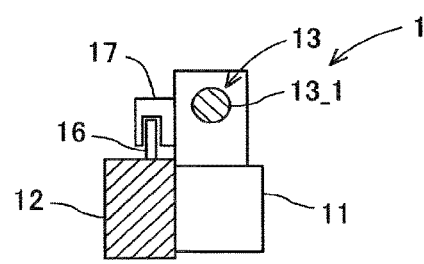
FIG. 3 is a sectional view along 3-3 of FIG. 1.

1. First Embodiment (1-1. Configuration of Detection Device 1)

A description will be given of the configuration of the detection device 1 of the first embodiment with reference to FIGS. 1 to 4. The detection device 1 is provided with a reference member 11, a moving member 12, a driving mechanism 13, a driving source 14, an incremental encoder 15 (hereinafter referred to as an encoder), a dog 16, a sensor 17, and a control device 18.

The reference member 11 is a member which is formed in a long shape and is fixed. The moving member 12 is formed in a long shape and moves relative to the reference member 11 in the longitudinal direction. The moving member 12 is capable of moving relative to the reference member 11 between a position illustrated in FIG. 1 and a position illustrated in FIG. 4. In the present embodiment, an example is given of a case in which the moving member 12 moves linearly with respect to the reference member 11; however, the moving member 12 may move relative to the reference member 11 along an arbitrary track such as a curved track. The reference member 11 and the moving member 12 are provided with a rail and a guide member (not illustrated) for guiding the movement of each other.

The driving mechanism 13 is a mechanism for driving the relative movement of the reference member 11 and the moving member 12. In the present embodiment, the driving mechanism 13 adopts a screw mechanism. In other words, the driving mechanism 13 is provided with a screw section 13_1 and a nut section 13_2 which screws together with the screw section 13_1. The screw section 13_1 is supported by the reference member 11 to be capable of rotating and the nut section 13_2 is fixed to the moving member 12. The attachment targets of the screw section 13_1 and the nut section 13_2 may be reversed from the above description.

The driving source 14 drives the relative movement between the reference member 11 and the moving member 12 by operating the driving mechanism 13. In the present embodiment, the driving source 14 is a motor which rotates the screw section 13_1.

Figure 4:
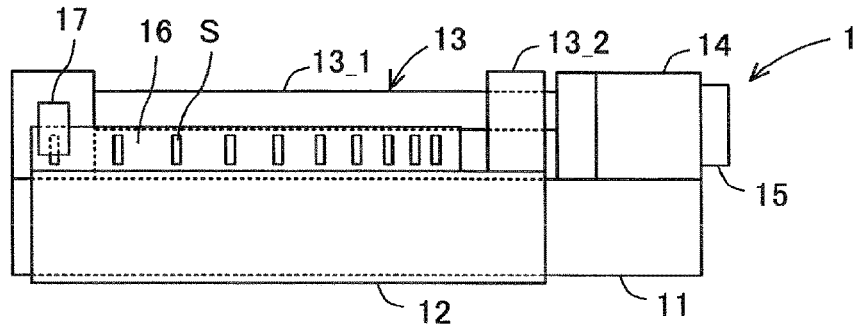
FIG. 4 is a configuration diagram of the detection device of the first embodiment and is a view of a state in which a moving member moves relative to a reference member.

The encoder 15 increases or decreases the count value each time the moving member 12 moves by a predetermined amount relative to the reference member 11. In the present embodiment, the encoder 15 increases or decreases the count value each predetermined rotation angle of the motor which is the driving source 14. In other words, the encoder 15 increases the count value in a case in which the moving member 12 moves one way with respect to the reference member 11, and decreases the count value in a case in which the moving member 12 moves the other way with respect to the reference member 11. For example, in FIG. 1, in a case in which the moving member 12 moves to the left side with respect to the reference member 11, the count value increases, and in a case in which the moving member 12 moves to the right side with respect to the reference member 11, the count value decreases. In other words, the count value at the position illustrated in FIG. 1 is the maximum value, and the count value at the position illustrated in FIG. 4 is the origin which is the minimum value.

The dog 16 is fixed to the moving member 12 and is provided with multiple slits S along the longitudinal direction of the moving member 12. The multiple slits S are formed with multiple kinds of separation distance between adjacent slits S. In the present embodiment, the separation distance between adjacent slits S is formed to increase toward one side (the left side in FIG. 1) in the relative movement direction of the moving member 12.

The sensor 17 is fixed to the reference member 11 and detects the presence or absence of the slits S of the dog 16. Specifically, the sensor 17 detects whether or not the slit S is present in a position facing the sensor 17 when the dog 16 moves. In other words, the sensor 17 is capable of detecting that movement from a state in which the slit S is present to a state in which the slit S is not present occurs, and is capable of detecting that movement from a state in which the slit S is not present into a state in which the slit S is present occurs. In the present embodiment, the sensor 17 outputs an OFF signal in a case in which the slit S is present, and outputs an ON signal in a case in which the slit S is not present.

The control device 18 controls the motor which is the driving source 14 based on the cumulative count value of the encoder 15 in which the origin is a reference. In a case in which the target position of the moving member 12 is input, the control device 18 controls the driving source 14 such that the actual cumulative count value of the encoder 15 becomes a cumulative count value corresponding to the target position.

The control device 18 controls the driving source 14 based on the detection results of the sensor 17. In the present embodiment, the control device 18 sets the origin based on the detection results of the sensor 17. In other words, the control device 18 controls the driving source 14 based on the origin which is set and the count value of the encoder 15. A detailed description will be given of the control device 18 later.

(1-2. Detailed Configuration of Slits S)

Figure 5:
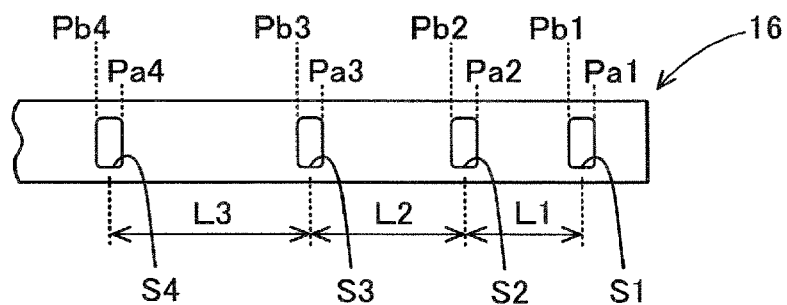
FIG. 5 is an enlarged view of a dog which configures the detection device of FIG. 1.

Next, a description of the detailed configuration of the slits S will be given with reference to FIG. 5. As illustrated in FIG. 5, the dog 16 is provided with multiple slits S. A separation distance L between adjacent slits S increases from one end to the other end side of the dog 16. The separation distance between adjacent slits S1 and S2, the separation distance between slits S2 and S3, and the separation distance between slits S3 and S4 are L1, L2, and L3 in order.

One edge (the right edge) of each slit S1, S2, S3, and S4 is Pa1, Pa2, Pa3, and Pa4, and the other edge (the left edge) of each slit S1, S2, S3, and S4 is Pb1, Pb2, Pb3, and Pb4.

The separation distances L1 to L3 of the adjacent slits S1 to S4 use the center positions of each of the slits S1 to S4 as references. Additionally, the references of the separation distances L1 to L3 of the adjacent slits S1 to S4 may be the right edges of each of the slits S1 to S4, or may be the left edges. The separation distances L1 to L3 of the adjacent slits S1 to S4 may be the distances of the portions in which the slits S1 to S4 are not present.

Figure 6:
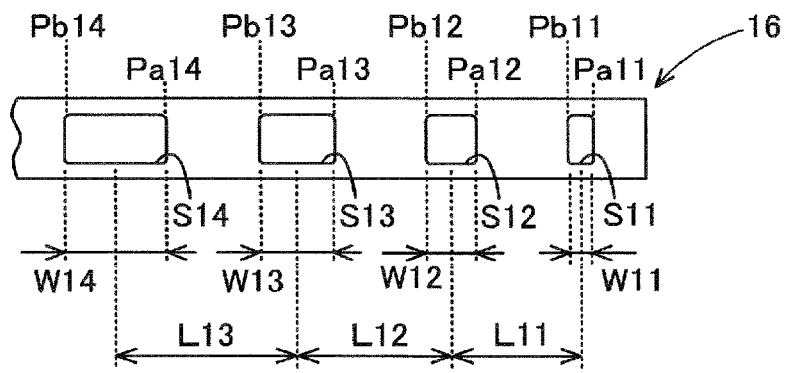
FIG. 6 is an enlarged view of a dog of another mode which configures the detection device of FIG. 1.

Another mode of the slits S will be described with reference to FIG. 6. As illustrated in FIG. 6, the dog 16 may be provided with multiple slits S11 to S14. A width W of the slit S itself increases from the right end of the dog 16 to the left side. The widths of the slits S11, S12, S13, and S14 are W11, W12, W13, and W14, in order. The distances of the portions in which the slits S are not present among the adjacent slits S are all the same. In this case, in a case in which the center positions of the slits S11 to S14 are used as references, separation distances L11 to L13 of the adjacent slits S11 to S14 increase from one end of the dog 16 to the other end side.

One edge (the right edge) of each slit S11, S12, S13, and S14 is Pa1, Pa2, Pa3, and Pa4, and the other edge (the left edge) of each slit S11, S12, S13, and S14 is Pb1, Pb2, Pb3, and Pb4. For example, the distance between Pb11 and Pa12 is the same as the distance between the Pb12 and Pa13.

(1-3. Detailed Configuration of Control Device 18)

Next, a description will be given of the detailed configuration of the control device 18 with reference to FIGS. 5 and 7 to 11. Here, a case is adopted in which the slits S are of the configuration illustrated in FIG. 5. However, a case in which the slits S of the configuration illustrated in FIG. 6 are adopted will be denoted, as appropriate.

Figure 7:
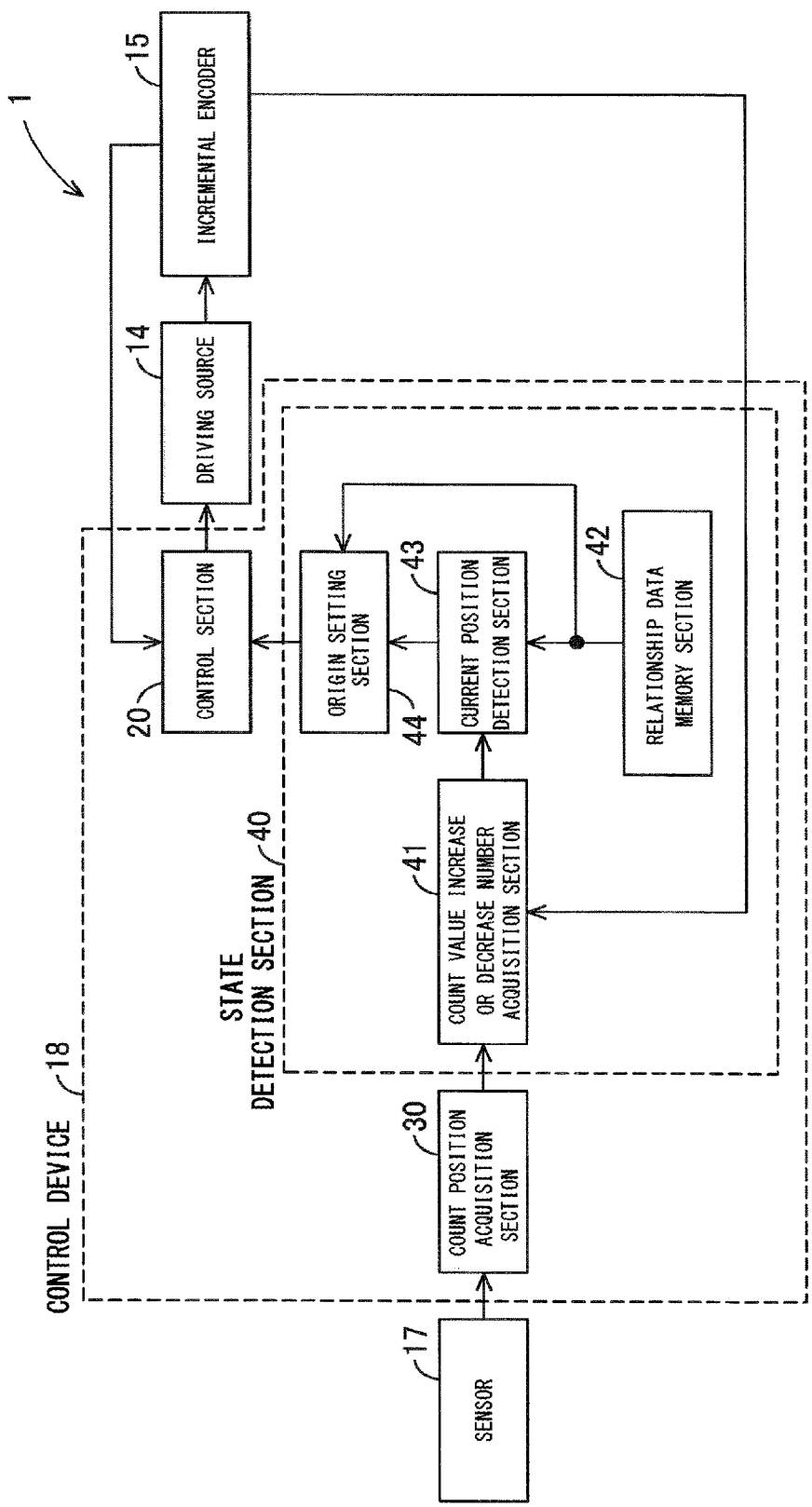
FIG. 7 is a function block diagram of the detection device of FIG. 1.

As illustrated in FIG. 7, the control device 18 is provided with a control section 20, a count position acquisition section 30, and a state detection section 40. The control section 20 controls the motor which is the driving source 14 based on the cumulative count value of the encoder 15 in which the origin is set as a reference. In a case in which the target position of the moving member 12 is input, the control device 18 controls the driving source 14 such that the actual cumulative count value of the encoder 15 becomes a cumulative count value corresponding to the target position.

In a case in which the moving member 12 moves relative to the reference member 11, the count position acquisition section 30 acquires a count start position Ps and a count end position Pe corresponding to the separation distance L between the adjacent slits S based on the detection results of the sensor 17. Here, the count start position Ps is a position at which the state is changed from that in which the slit S is not present to one in which the slit S is present, and the count end position Pe is a position at which the state is changed from that in which the slit S of the count start position Ps is not present to one in which the next slit S is present. However, the count start position Ps and the count end position Pe are examples, and as long as it is possible to acquire the distance between two predetermined points, other modes may be adopted. For example, the count start position Ps and the count end position Pe may be set to state change positions which are opposite those described above, one edge (the right end) of the slit S may be the count start position Ps and the one edge (the right end) of the next slit S may be the count end position Pe.

In a case in which the moving member 12 moves to the right side, that is, in a case in which the moving member 12 moves from the state of FIG. 1 to the state of FIG. 4, as illustrated in FIGS. 5 and 8, the sensor 17 performs detection in the order of the slits S1, S2, S3, and S4 as time elapses. FIG. 8 is a diagram in which time elapses toward the left side. The sensor 17 outputs ON when in a position at which the slit S is present and outputs OFF when in a position at which the slit S is not present.

In a case in which the position facing the sensor 17 moves from the slit S1 to the slit S2, as illustrated in the top level of FIG. 10, the count start position Ps is Pa1 and the count end position Pe is Pa2. The separation distance between Pa1 which is the count start position Ps and Pa2 which is the count end position Pe at this time corresponds to the separation distance L1 between the slits S1 and S2. When the moving member 12 moves further to the right side, the count start position Ps becomes Pa2 and the count end position Pe becomes Pa3. The separation distance between Pa2 which is the count start position Ps and Pa3 which is the count end position Pe at this time corresponds to the separation distance L2 between the slits S2 and S3.

Meanwhile, in a case in which the moving member 12 moves to the left side, that is, in a case in which the moving member 12 moves from the state of FIG. 4 to the state of FIG. 1, as illustrated in FIGS. 5 and 9, the sensor 17 performs detection in the order of the slits S4, S3, S2, and S1 as time elapses. FIG. 9 is a diagram in which time elapses toward the right side.

In a case in which the position facing the sensor 17 moves from the slit S4 to the slit S3, as illustrated in the bottom level of FIG. 10, the count start position Ps is Pb4 and the count end position Pe is Pb3. The separation distance between Pb4 which is the count start position Ps and Pb3 which is the count end position Pe at this time corresponds to the separation distance L3 between the slits S4 and S3. When the moving member 12 moves further to the left side, the count start position Ps becomes Pb3 and the count end position Pe becomes Pb2. The separation distance between Pb3 which is the count start position Ps and Pb2 which is the count end position Pe at this time corresponds to the separation distance L2 between the slits S3 and S2.

The state detection section 40 detects the state of the moving member 12 based on the count start position Ps, the count end position Pe, and the count value of the encoder 15. In the present embodiment, the state detection section 40 detects the current position of the moving member 12 and sets the origin. The state detection section 40 is provided with a count value increase or decrease number acquisition section 41, a count value to positional relationship data memory section 42 (hereinafter referred to as a relationship data memory section), a current position detection section 43, and an origin setting section 44.

The count value increase or decrease number acquisition section 41 acquires the count value increase or decrease number from the count start position Ps to the count end position Pe. In a case in which the moving member 12 moves to the right side of FIG. 1, the count start position Ps is Pa1, and when the count end position Pe is Pa2, as illustrated in FIGS. 8 and 10, the count value increases by N1. The other count value increase or decrease numbers in a case in which the moving member 12 moves to the right side in FIG. 1 are as illustrated in FIGS. 8 and 10.

In a case in which the moving member 12 moves to the left side of FIG. 1, the count start position Ps is Pb4, and when the count end position Pe is Pb3, as illustrated in FIGS. 9 and 10, the count value decreases by N3. The other count value increase or decrease numbers in a case in which the moving member 12 moves to the left side in FIG. 1 are as illustrated in FIGS. 9 and 10.

The relationship data memory section 42 stores count number to positional relationship data (hereinafter referred to as relationship data) which is set in advance. As illustrated in FIG. 11, the relationship data is data in which the relationship is set between the count value increase or decrease number corresponding to the separation distance L between the adjacent slits S, the relative position of the moving member 12 to the reference member 11, and the cumulative count value corresponding to the relevant position.

For example, as illustrated in FIGS. 8 and 11, when the count start position Ps is Pa1 and the count end position Pe is Pa2, and further, when the sensor 17 is positioned at Pa2 which is the count end position Pe, the current position of the moving member 12 is P11. As illustrated in FIGS. 9 and 11, when the count start position Ps is Pb4 and the count end position Pe is Pb3, and further, when the sensor 17 is positioned at Pb3 which is the count end position Pe the current position of the moving member 12 is P23.

The cumulative count value which is included in the relationship data is the cumulative count value of the encoder 15 corresponding to the current position of the moving member 12 in a case in which the origin is the reference. As illustrated in FIG. 11, for example, the cumulative count value corresponding to the current position P12 is NA12.

Here, in a case in which the dog 16 is provided with the slits S11 to S14 illustrated in FIG. 6, the count value increase or decrease number in the relationship data is a value corresponding to the width of the slit S itself. As illustrated in FIG. 6, the widths of the slits S themselves differ from each other. The separation distances between the adjacent slits S are the same. Therefore, when the count start position Ps is Pa1 and the count end position Pe is Pa2, the count value increase or decrease number is a value corresponding to a total of the width of the relevant slit S itself and the separation distance between the adjacent slits S. The current position and the cumulative count value which are included in the relationship data are essentially the same as described above.

The current position detection section 43 detects (or calculates) the current position based on the count value increase or decrease number which is acquired by the count value increase or decrease number acquisition section 41 and the relationship data which is stored in the relationship data memory section 42. For example, as illustrated in FIG. 11, when the count value increase or decrease number is N2, the current position of the moving member 12 is P12. In other words, as illustrated in FIG. 8, when the sensor 17 detects Pa3 which is the count end position Pe, the current position of the moving member 12 is P12.

The origin setting section 44 sets the origin of the cumulative count value in the control section 20 based on the current position which is detected by the current position detection section 43. For example, in a case in which the current position is P12, as illustrated in FIG. 11, the origin setting section 44 sets the current cumulative count value as NA12 in the control section 20. In other words, the origin setting section 44 sets a position which is decreased by NA12 from the current cumulative count value of the encoder 15 as the origin.

(1-4. Operations of Detection Device 1)

Next, a description will be given of the operations of the detection device 1. First, the detection device 1 performs the setting of the origin. Then, the control section 20 controls the driving source 14 to cause the moving member 12 to operate. At this time, the direction in which the moving member 12 operates may be the right side or the left side in FIG. 1.

Along with the operation of the moving member 12, the count position acquisition section 30 acquires the count start position Ps. Then, the count value increase or decrease number acquisition section 41 starts counting the count value of the encoder 15. Here, the movement amount of the moving member 12 from the start of the operation of the moving member 12 until the sensor 17 detects the count start position Ps is less than or equal to the maximum value of the separation distance between the adjacent slits S. Therefore, the sensor 17 reaches the count start position Ps with little movement of the moving member 12.

Next, along with the operation of the moving member 12, the count position acquisition section 30 acquires the count end position Pe. At this time, the count value increase or decrease number acquisition section 41 acquires the count value increase or decrease number from the count start position Ps to the count end position Pe. Then, the current position detection section 43 detects (or calculates) the current position of the moving member 12 based on the count value increase or decrease number and the relationship data which are acquired. The origin setting section 44 sets the origin based on the current position of the moving member 12. Subsequently, the control section 20 controls the driving source 14 based on the cumulative count value of the encoder 15 when the origin is set as a reference by the origin setting section 44. A configuration may be adopted in which the encoder 15 further includes a rotation origin, and the control section 20 controls the motor which is the driving source 14 based on the rotation origin of the encoder 15 and the cumulative count value of the encoder 15.

2. Second Embodiment

Figure 12:
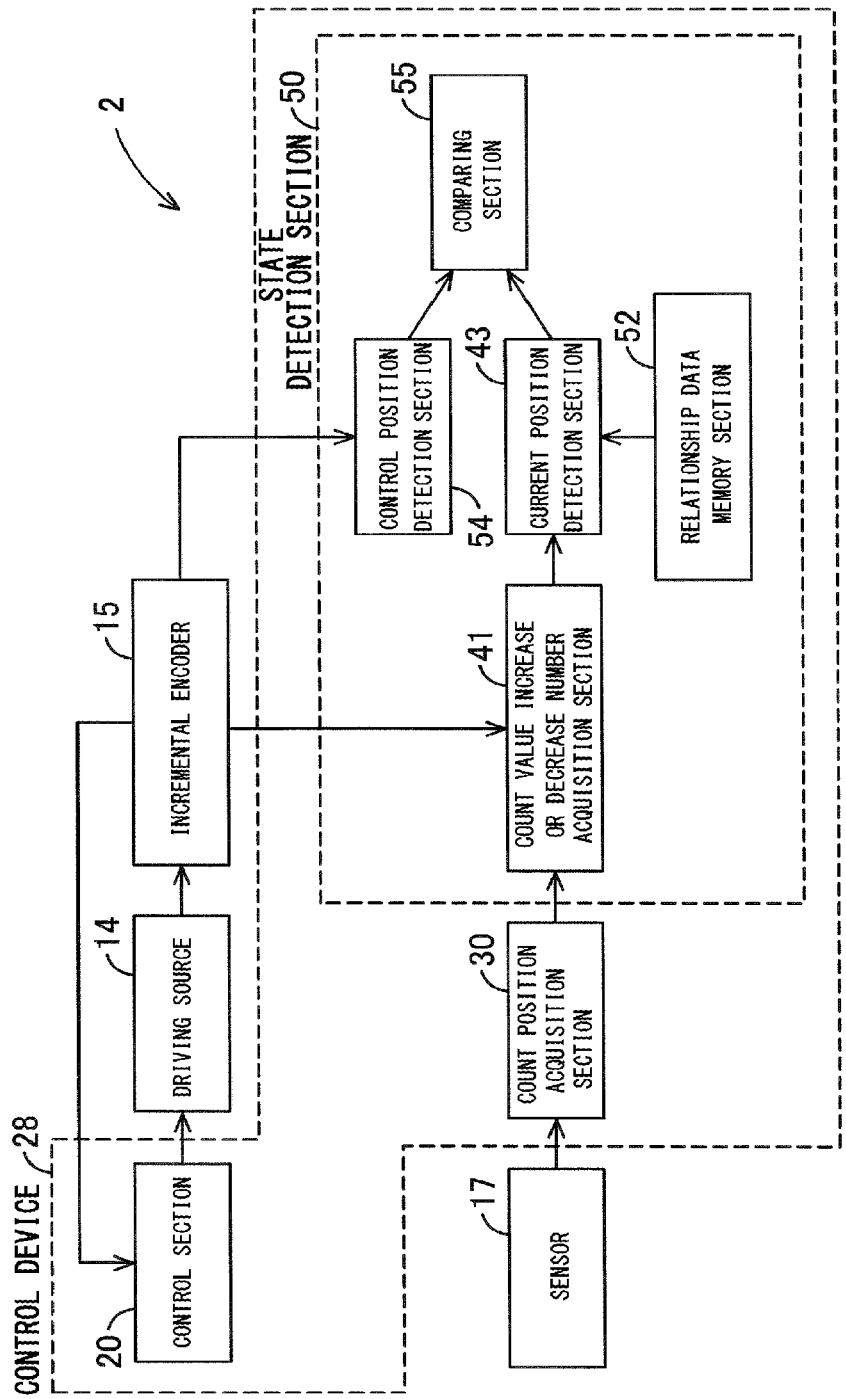
FIG. 12 is a function block diagram of a detection device of a second embodiment.

A description will be given of a detection device 2 of the second embodiment with reference to FIG. 12. In the detection device 2 of the present embodiment, the same reference numerals are given to the same constituent components as those of the detection device 1 of the first embodiment. A control device 28 of the detection device 2 is provided with the control section 20, the count position acquisition section 30, and a state detection section 50. The state detection section 50 is provided with the count value increase or decrease number acquisition section 41, a relationship data memory section 52, a current position detection section 43, a control position calculation section 54, and a comparing section 55.

Of the relationship data of the first embodiment, the relationship data memory section 52 stores the relationship data between the count value increase or decrease number and the current position. In the present embodiment, the relationship data does not include the cumulative count value. The control position calculation section 54 acquires the cumulative count value of the encoder 15 and calculates the current control position which is controlled by the control section 20 based on the cumulative count value. The cumulative count value of the encoder 15 is obtained based on the origin of the position of the moving member 12 and the count value which is used in the control of the driving source 14. In other words, the cumulative count value is obtained by increasing or decreasing the count value of the encoder 15 with the count value of the origin as zero.

The comparing section 55 compares the control position which is the current position of the moving member 12 which is calculated by the control position calculation section 54 and an estimate position which is the current position of the moving member 12 which is detected (or calculated) by the current position detection section 43. The comparing section 55 calculates the difference amount between the control position and the estimate position.

In a case in which the difference amount which is calculated by the comparing section 55 is greater than a predetermined value, the comparing section 55 may stop the control process by the control section 20, may display the fact on a display screen, and may perform warning guidance.

3. Third Embodiment

Figure 13:
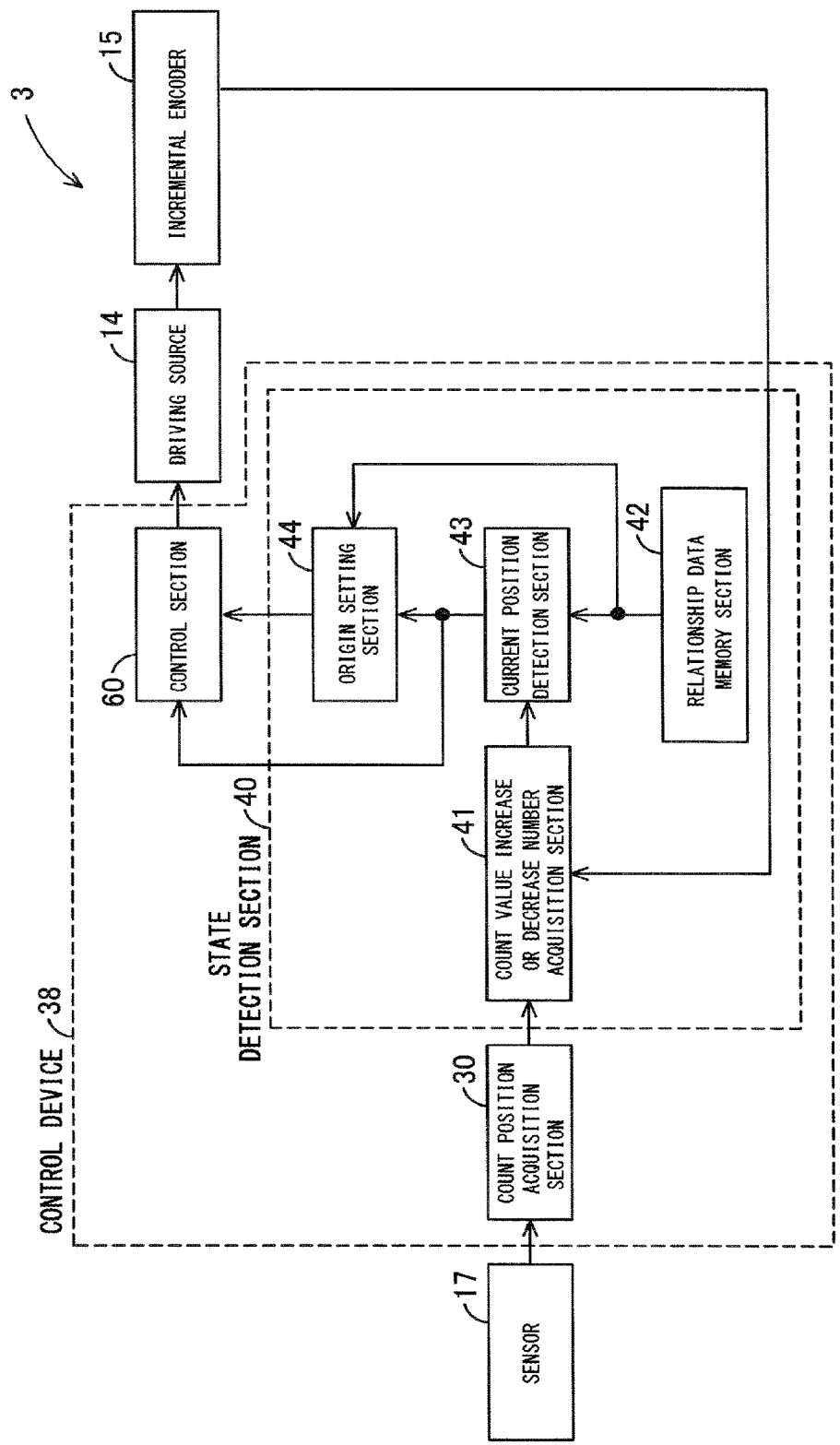
FIG. 13 is a function block diagram of a detection device of a third embodiment.

A description will be given of a detection device 3 of the third embodiment with reference to FIG. 13. In the detection device 3 of the present embodiment, the same reference numerals are given to the same constituent components as those of the detection device 1 of the first embodiment. A control device 38 of the detection device 3 is provided with a control section 60, the count position acquisition section 30, and the state detection section 40. In other words, in the detection device 3, only the control section 60 differs from detection device 1 of the first embodiment.

The control section 60 controls the driving source 14 based on the current position which is detected (calculated) by the current position detection section 43 and the origin which is set by the origin setting section 44. In other words, the control section 60 does not control the driving source 14 based on the cumulative count value which is detected by the encoder 15 and instead detects the current position based on the count value increase or decrease number which is obtained using the slits S and controls the driving source 14 based on the detected current position. In other words, the control section 60 performs control similar to absolute positional control using the slits S and the encoder 15.

4. Fourth Embodiment

A description will be given of a detection device 4 of the fourth embodiment with reference to FIGS. 14 and 15. In the detection device 3 of the present embodiment, the same reference numerals are given to the same constituent components as those of the detection device 1 of the first embodiment and the detection device 2 of the second embodiment.

Figure 14:
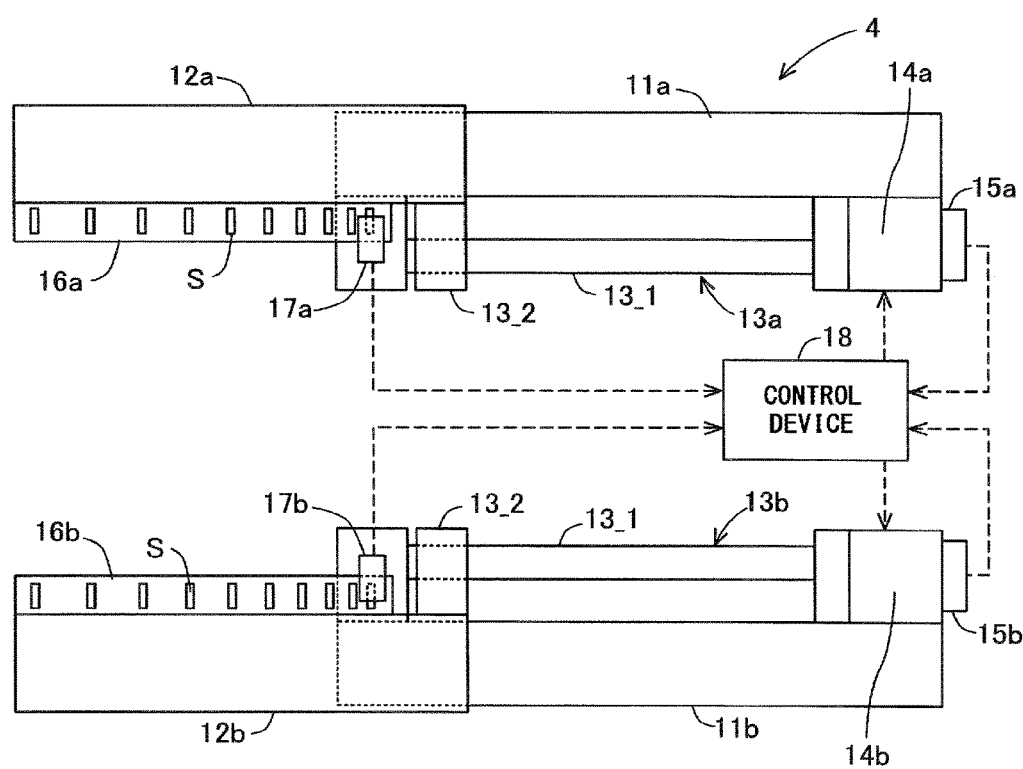
FIG. 14 is a configuration diagram of a detection device of a fourth embodiment.

As illustrated in FIG. 14, the detection device 4 is provided with a first unit 71 and a second unit 72. The first unit 71 and the second unit 72 are provided with reference members 11a and 11b, moving members 12a and 12b, driving mechanisms 13a and 13b, driving sources 14a and 14b, encoders 15a and 15b, dogs 16a and 16b, sensors 17a and 17b, respectively, and are further provided with a control device 48. Here, the reference members 11a and 11b, the moving members 12a and 12b, the driving mechanisms 13a and 13b, the driving sources 14a and 14b, the encoders 15a and 15b, the dogs 16a and 16b, and the sensors 17a and 17b correspond to the reference member 11, the moving member 12, the driving mechanism 13, the driving source 14, the encoder 15, the dog 16, and the sensor 17 of the first embodiment.

Figure 15:
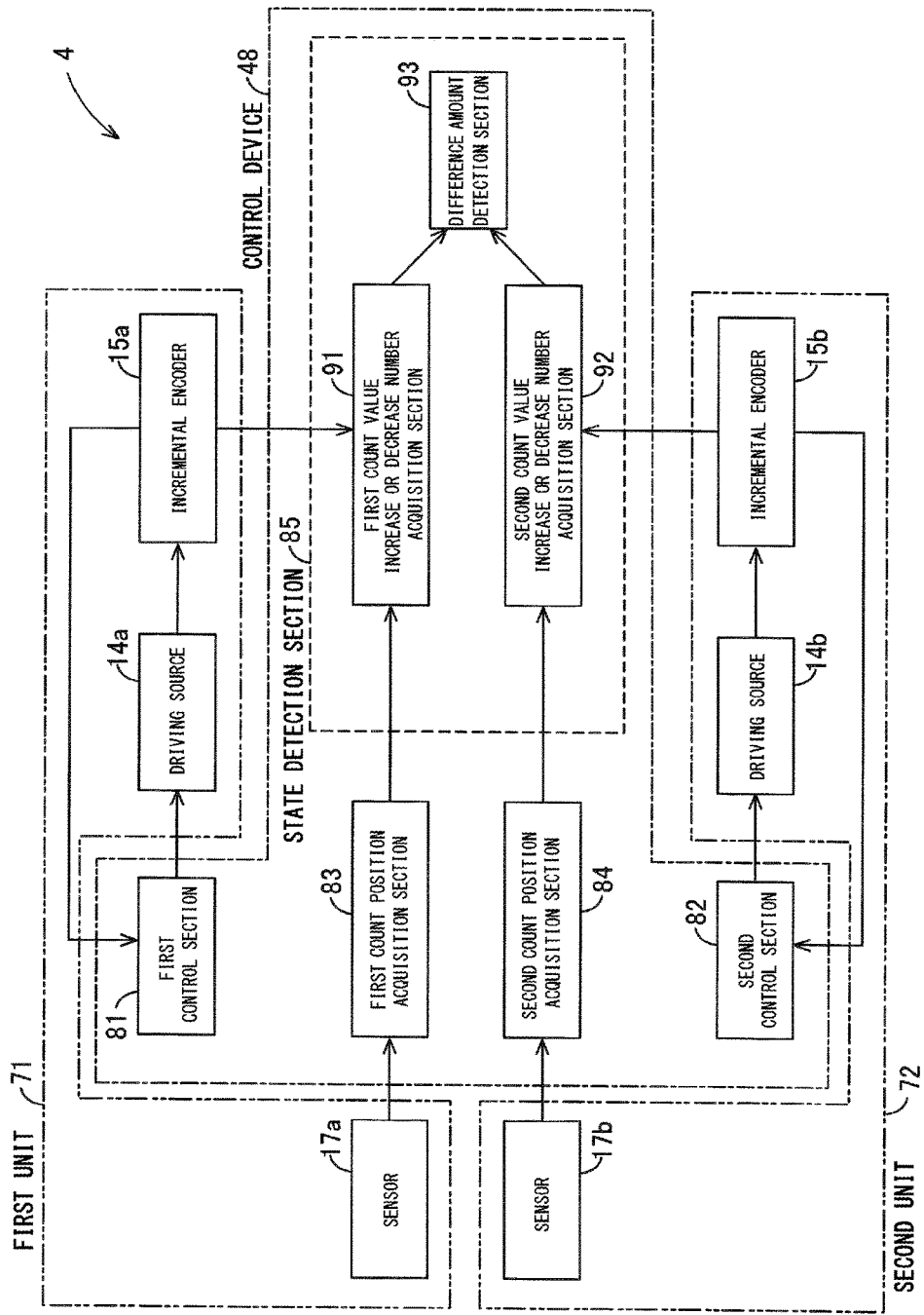
FIG. 15 is a function block diagram of the detection device of the fourth embodiment.

As illustrated in FIG. 15, the control device 48 is provided with a first control section 81 which controls the driving source 14a of the first unit 71, a second control section 82 which controls the driving source 14b of the second unit 72, a first count position acquisition section 83, a second count position acquisition section 84, and a state detection section 85. Here, the first control section 81 and the second control section 82 are controlled in synchronization. In other words, the driving source 14a of the first unit 71 and the driving source 14b of the second unit 72 are driven in synchronization.

The first count position acquisition section 83 and the second count position acquisition section 84 correspond to the count position acquisition section 30 of the first embodiment. However, the first count position acquisition section 83 acquires the count start position Ps and the count end position Pe of the dog 16a based on the detection results of the sensor 17a of the first unit 71. Meanwhile, the second count position acquisition section 84 acquires the count start position Ps and the count end position Pe of the dog 16b based on the detection results of the sensor 17b of the second unit 72.

The state detection section 85 is provided with a first count value increase or decrease number acquisition section 91, a second count value increase or decrease number acquisition section 92, and a difference amount detection section 93. The first count value increase or decrease number acquisition section 91 and the second count value increase or decrease number acquisition section 92 correspond to the count value increase or decrease number acquisition section 41 of the first embodiment.

The first count value increase or decrease number acquisition section 91 acquires the count value increase or decrease number of the encoder 15a from the count start position Ps to the count end position Pe which is obtained by the first count position acquisition section 83. Meanwhile, the second count value increase or decrease number acquisition section 92 acquires the count value increase or decrease number of the encoder 15b from the count start position Ps to the count end position Pe which is obtained by the second count position acquisition section 84.

The difference amount detection section 93 detects the difference amount between the count value which is obtained by the first count value increase or decrease number acquisition section 91 and the count value which is obtained by the second count value increase or decrease number acquisition section 92. Here, an ideal state is one in which the moving members 12a and 12b are positioned at the same position with respect to the reference members 11a and 11b since the driving source 14a of the first unit 71 and the driving source 14b of the second unit 72 are controlled in synchronization. The slits S which are formed in each of the dogs 16a and 16b are also formed in the same manner. Therefore, if the ideal state is achieved, the count value which is obtained by the first count value increase or decrease number acquisition section 91 matches the count value which is obtained by the second count value increase or decrease number acquisition section 92.

However, in a case in which the moving members 12a and 12b deviate relatively, the count values of both do not match. In other words, by detecting the difference amount of the count values of both, the difference amount detection section 93 determines that a large deviation arises between the moving members 12a and 12b in a case in which the difference amount is greater than a predetermined value. Meanwhile, in a case in which the difference amount of the count values of both is less than or equal to the predetermined value, the difference amount detection section 93 determines that deviation does not substantially arise between the moving members 12a and 12b.

5. Fifth Embodiment (5-1. Overall Configuration of Assistant Robot 100)

Figure 16:
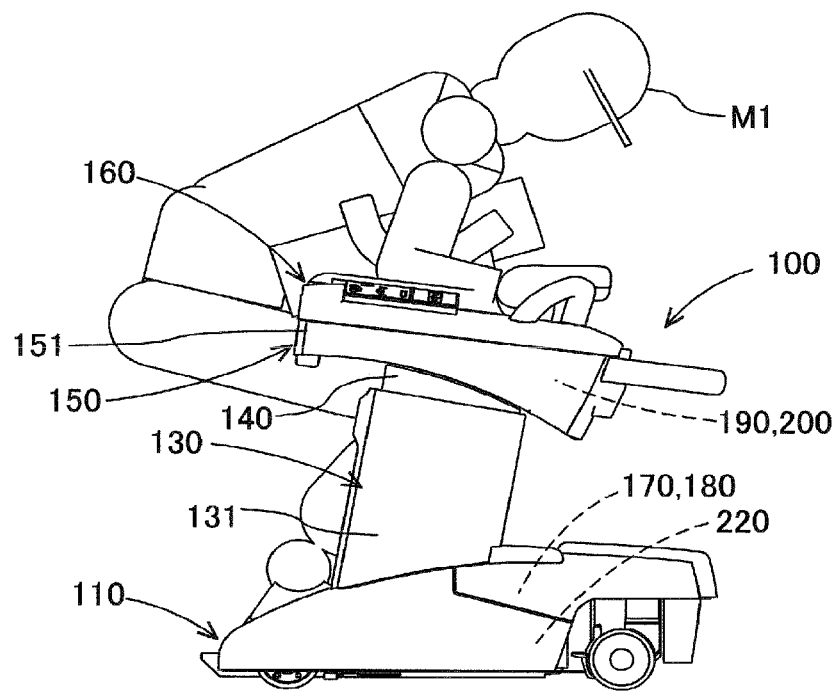
FIG. 16 is a side view of a sitting posture of an assistant robot of a fifth embodiment.

The assistant robot 100 of the present embodiment is provided with one of the detection devices 1, 2, 3, and 4. A description will be given of the overall configuration of the assistant robot 100 with reference to FIGS. 16 and 17. The assistant robot 100 supports a portion (for example, an upper body) of a body of a person in need of assistance M1 to aid a standing action and a seating action. The assistant robot 100 is provided with a base 110, lifting and lowering arms 120 and 130, a lifting and lowering section 140, a holding section 150, lifting and lowering actuators 170 and 180, forward-and-backward movement actuators 190 and 200, and a control device 220. In the following description, front, rear, left, and right are the front, rear, left, and right when the advancing direction of the assistant robot 100 is the front direction.

The base 110 is a part which is installed on the ground or a floor. The base 110 is formed in a U shape which is open to the rear in plan view. The base 110 is provided with four wheels and is capable of advancing and retreating. The lifting and lowering arms 120 and 130 are provided on the left and the right of the upper face of the base 110 respectively and are provided to be capable of extending and withdrawing upward. The lifting and lowering arms 120 and 130 extend and withdraw linearly in a direction in which the upper end is inclined forward with respect to the lower end. The lifting and lowering section 140 is provided on the upper ends of the lifting and lowering arms 120 and 130. The lifting and lowering section 140 is lifted and lowered relative to the base 110 due to the lifting and lowering arms 120 and 130 extending and withdrawing in the up-down direction. In other words, the lifting and lowering section 140 moves linearly in a direction moving to the front as the lifting and lowering section 140 is lifted with respect to the base 110.

The holding section 150 is positioned on the top side of the lifting and lowering section 140 and is supported by the lifting and lowering section 140. The holding section 150 moves forward and backward and moves in an inclined manner with respect to the lifting and lowering section 140. The holding section 150 holds a portion of the body of the person in need of assistance M1. The holding section 150 is provided with a main body frame 151 and an attachment 160 which is replaceably provided to the main body frame 151 according to the person in need of assistance M1.

Figure 17:
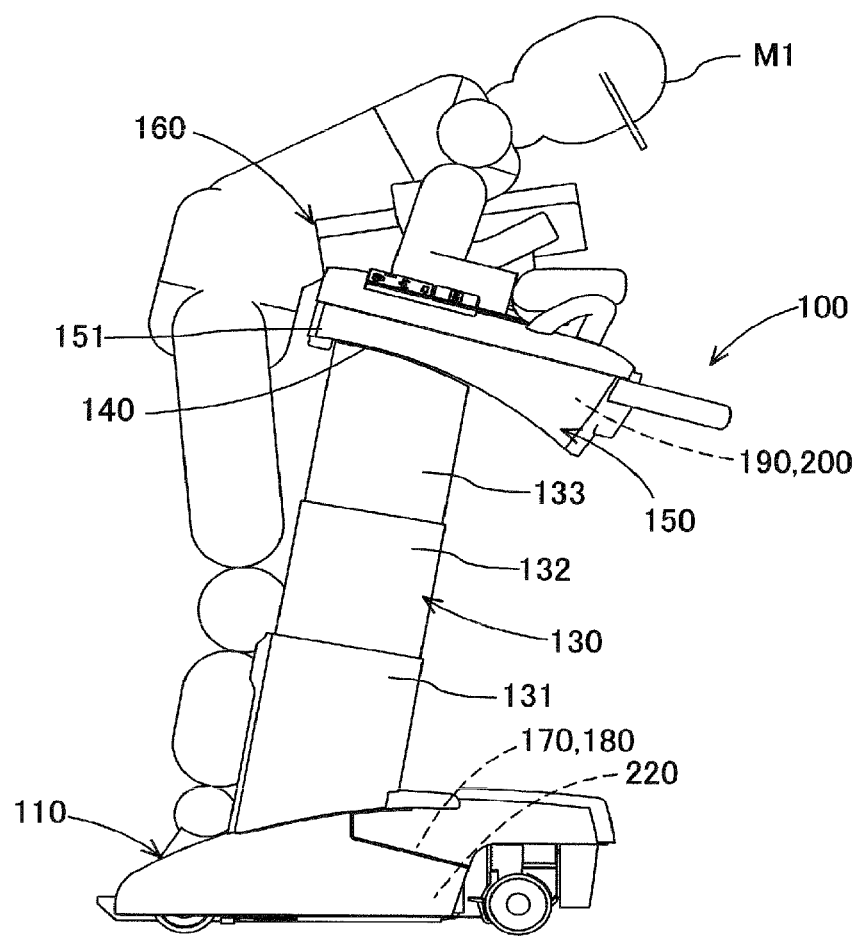
FIG. 17 is a side view of a standing posture of the assistant robot.

The lifting and lowering actuators 170 and 180 perform the driving of the lifting and lowering operations of the lifting and lowering section 140 with respect to the base 110. The lifting and lowering actuators 170 and 180 drive the extending and withdrawing of the corresponding lifting and lowering arms 120 and 130, respectively. In other words, due to the driving of the lifting and lowering actuators 170 and 180, the lifting and lowering section 140 performs the operation from the state illustrated in FIG. 16 to the lifted position and the advancing position which is illustrated in FIG. 17 with respect to the base 110, and also performs the opposite operation. The lifting and lowering actuators 170 and 180 are provided along the base 110 and the lifting and lowering arms 120 and 130.

The forward-and-backward movement actuators 190 and 200 perform the driving of the front-rear movement and the inclined movement of the holding section 150 with respect to the lifting and lowering section 140. In other words, due to the driving of the forward-and-backward movement actuators 190 and 200, the holding section 150 performs an operation from a state illustrated in FIG. 16 to an advancing position and an inclined state illustrated in FIG. 17 with respect to the lifting and lowering section 140, and performs the opposite operation. The forward-and-backward movement actuators 190 and 200 are provided along the lifting and lowering section 140 and the holding section 150.

The control device 220 controls the lifting and lowering actuators 170 and 180 and the forward-and-backward movement actuators 190 and 200 according to the operations of the person in need of assistance M1. The control device 220 performs coordinated control of the lifting and lowering actuators 170 and 180 and the forward-and-backward movement actuators 190 and 200 while performing synchronized control of both of the forward-and-backward movement actuators 190 and 200 and while performing synchronized control of both of the lifting and lowering actuators 170 and 180.

(5-2. Internal Structure of Assistant Robot 100)

Figure 18:
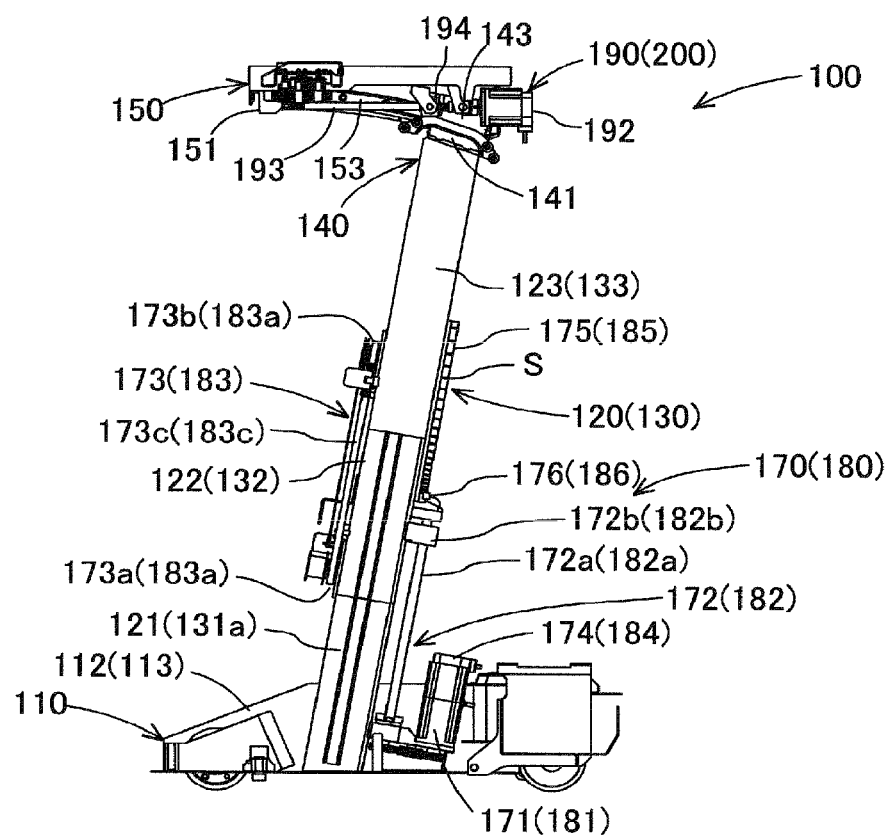
FIG. 18 is an internal structure diagram of the assistant robot and is a sectional view of a left-right direction center portion.
Figure 19:
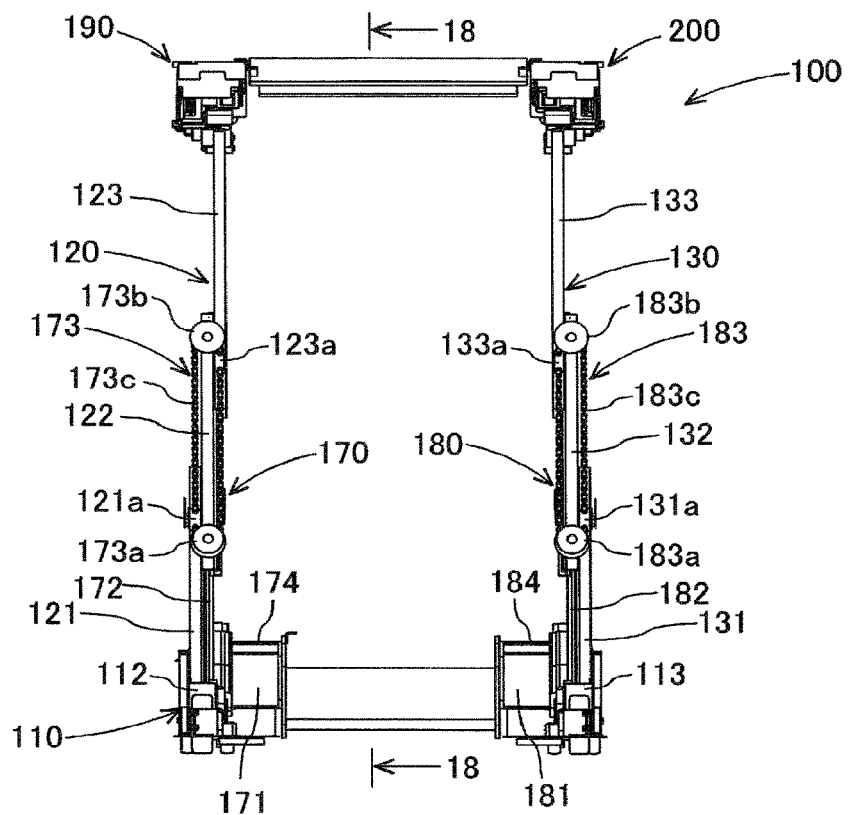
FIG. 19 is a view of FIG. 17 as viewed from the right side (advancing direction rear side).
Figure 20:
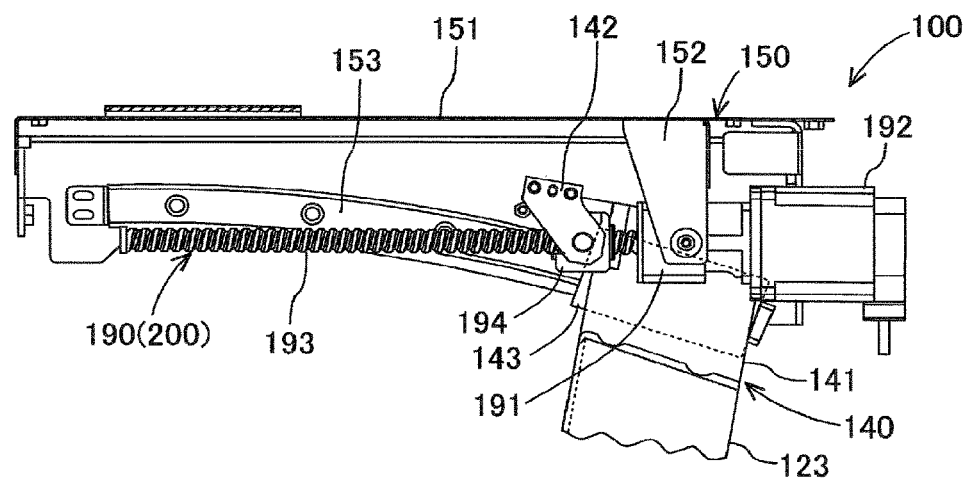
FIG. 20 is an enlarged view of a portion including a forward-and-backward movement actuator of FIG. 18.

A description will be given of the internal structure of the assistant robot 100 excluding the covers of the parts with reference to FIGS. 18 to 20. The base 110 is provided with four wheels. The lifting and lowering arms 120 and 130 are provided with first arm members 121 and 131, second arm members 122 and 132, and third arm members 123 and 133. The first arm members 121 and 131, the second arm members 122 and 132, and the third arm members 123 and 133 are formed in a long straight shape. The first arm members 121 and 131 are fixed to left and right frames 112 and 113 of the base 110, respectively. The first arm members 121 and 131 are fixed, inclined forward at a predetermined angle (for example, 80°) with respect to the base 110.

The second arm members 122 and 132 slide in the longitudinal direction with respect to the first arm members 121 and 131. When the second arm members 122 and 132 are contracted, the majority of the second arm members 122 and 132 are housed in the first arm members 121 and 131. The third arm members 123 and 133 slide in the longitudinal direction with respect to the second arm members 122 and 132. The lifting and lowering section 140 is fixed to the upper ends of the third arm members 123 and 133. When the third arm members 123 and 133 are contracted, the majority of the third arm members 123 and 133 are housed in the second arm members 122 and 132.

The lifting and lowering actuators 170 and 180 are provided with rotary driving sources 171 and 181, first lifting and lowering mechanisms 172 and 182, second lifting and lowering mechanisms 173 and 183, incremental encoders 174 and 184, dogs 175 and 185, and sensors 176 and 186. The rotary driving sources 171 and 181 are provided with motors which output rotational driving force. The rotary driving sources 171 and 181 may be provided with deceleration mechanisms, as appropriate. The incremental encoders 174 and 184 increase or decrease the count value for every predetermined rotation angle of the rotary driving sources 171 and 181.

The first lifting and lowering mechanisms 172 and 182 are mechanisms which are connected to the rotary driving sources 171 and 181 and which lift and lower the second arm members 122 and 132 with respect to the first arm members 121 and 131. The first lifting and lowering mechanisms 172 and 182 are screw mechanisms. It is possible to apply a belt mechanism to the first lifting and lowering mechanisms 172 and 182. The first lifting and lowering mechanisms 172 and 182 are provided with screw axes 172a and 182a which are rotationally driven by the rotary driving sources 171 and 181, and nut members 172*b* and 182*b*.

In the present embodiment, the screw axes 172*a* and 182*a* are fixed to the first arm members 121 and 131, and the nut members 172*b* and 182*b* are fixed to the second arm members 122 and 132. In other words, the nut members 172*b* and 182*b* are lifted and lowered due to the screw axes 172*a* and 182*a* rotating due to the rotary driving sources 171 and 181. In this manner, the second arm members 122 and 132 are lifted and lowered with respect to the first arm members 121 and 131.

The second lifting and lowering mechanisms 173 and 183 are mechanisms which lift and lower the third arm members 123 and 133 with respect to the second arm members 122 and 132. The second lifting and lowering mechanisms 173 and 183 are belt mechanisms. It is possible to apply a screw mechanism to the second lifting and lowering mechanisms 173 and 183. The second lifting and lowering mechanisms 173 and 183 are provided with lower pulleys 173*a* and 183*a* and upper pulleys 173*b* and 183*b* which are provided to be capable of rotating on both ends in the longitudinal direction of the second arm members 122 and 132.

The second lifting and lowering mechanisms 173 and 183 are provided with belts 173*c* and 183*c* which are bridged across the lower pulleys 173*a* and 183*a* and the upper pulleys 173*b* and 183*b*. One of the belts 173*c* and 183*c* is fixed to upper end connecting members 121*a* and 131*a* of the first arm members 121 and 131, and the other of the belts 173*c* and 183*c* is fixed to lower end connecting members 123*a* and 133*a* of the third arm members 123 and 133. In other words, when the second arm members 122 and 132 are lifted with respect to the first arm members 121 and 131, the belts 173*c* and 183*c* rotate together with the lifting operation. The third arm members 123 and 133 are lifted with respect to the second arm members 122 and 132 together with the rotation operation. An operation in which the second arm members 122 and 132 and the third arm members 123 and 133 are lowered is an operation in which the operation described above is reversed.

The dogs 175 and 185 are fixed to the second arm members 122 and 132 and are provided with multiple slits S. The multiple slits S are formed with multiple kinds of separation distance between adjacent slits S. In the present embodiment, the separation distance between the adjacent slits S is formed to increase toward one side of the relative movement direction of the second arm members 122 and 132. The sensors 176 and 186 detect the presence or absence of the slits S of the dogs 175 and 185.

A description will be given of the lifting and lowering section 140, the holding section 150, and the forward-and-backward movement actuators 190 and 200 with reference to FIG. 20. Here, in the following description, a description will be given of the connecting structure between the left side portion of the lifting and lowering section 140 and the left side portion of the holding section 150. The connecting structure between the right side portion of the lifting and lowering section 140 and the right side portion of the holding section 150 is a structure in which the structure of the left side is rendered left-right symmetrical. The lifting and lowering section 140 is provided with a base section 141 which is fixed to the upper end of the third arm member 123, an oscillation support section 142 which is fixed to one side face of the base section 141, and a block-shaped guided member 143 which is fixed to the other side face of the base section 141 and has a groove on the side.

The holding section 150 moves forward and backward and moves in an inclined manner with respect to the lifting and lowering section 140 and is provided with the main body frame 151, an oscillation support section 152, a guide path 153, and the attachment 160. The oscillation support section 152 of the holding section 150 is fixed to the main body frame 151 and is positioned in a position which overlaps the oscillation support section 142 of the lifting and lowering section 140 in the front-rear direction. The guide path 153 is a rail member which extends in the front-rear direction and is fixed to the side face of the main body frame 151. The guide path 153 is formed in a curved non-linear shape, specifically, in an arc shape. The guide path 153 is positioned lower toward the front and is an upward-facing convex arc shape. The guide path 153 holds the guided member 143 so as to be sandwiched by the guided member 143 from the up-down direction. In other words, the guide path 153 causes the guided member 143 to move in an arc shape along the guide path 153. The main body frame 151 of the holding section 150 moves forward and backward and moves in an inclined manner with respect to the lifting and lowering section 140 due to the guided member 143 moving in an arc shape along the guide path 153.

The forward-and-backward movement actuators 190 and 200 perform the driving of the front-rear movement and the inclined movement of the holding section 150 with respect to the lifting and lowering section 140. The forward-and-backward movement actuator 190 is provided with a supported member 191, a rotary driving source 192, a screw axis 193, and a nut member 194. The supported member 191 is supported by the oscillation support section 152 of the holding section 150 to be capable of oscillating, the rotary driving source 192 is a motor, for example, and is fixed to the supported member 191, the screw axis 193 is connected to the output shaft of the rotary driving source 192, and the nut member 194 engages with the screw axis 193 and is supported by the oscillation support section 142 of the lifting and lowering section 140 to be capable of inclined movement.

In other words, the distance between the supported member 191 which supports one end of the screw axis 193 and the nut member 194 changes with the rotation of the rotary driving source 192. At this time, the posture of the holding section 150 with respect to the lifting and lowering section 140 is determined by the guided member 143 moving in an arc shape along the guide path 153. Therefore, the screw axis 193 and the nut member 194 move in an inclined manner due to the holding section 150 moving forward and backward and moving in an inclined manner with respect to the lifting and lowering section 140.

(5-3. Operations of Control Device 220)

The control of the lifting and lowering actuators 170 and 180 by the control device 220 can be applied in essentially the same manner as the control of the control device 18 in the detection device 1 of the first embodiment. The first arm members 121 and 131, the second arm members 122 and 132, the first lifting and lowering mechanisms 172 and 182, the rotary driving sources 171 and 181, the incremental encoders 174 and 184, the dogs 175 and 185, and the sensors 176 and 186 correspond to the reference member 11, the moving member 12, the driving mechanism 13, the driving source 14, the encoder 15, the dog 16, and the sensor 17 in the detection device 1. In other words, the origin in the control section 20 which controls each of the rotary driving sources 171 and 181 is set by the origin setting section 44 of the state detection section 40 of the control device 220.

The control of the lifting and lowering actuators 170 and 180 by the control device 220 can be applied in essentially the same manner as the control of the control device 28 in the detection device 2 of the second embodiment. In this case, the comparing section 55 in the state detection section 50 compares the control position which is the current position of the second arm members 122 and 132 which is calculated by the control position calculation section 54 and an estimate position which is the current position of the second arm members 122 and 132 which is detected (or calculated) by the current position detection section 43. The comparing section 55 calculates the difference amount between the control position and the estimate position.

The control of the lifting and lowering actuators 170 and 180 by the control device 220 can be applied in essentially the same manner as the control of the control device 38 in the detection device 3 of the third embodiment. In other words, the control section 60 of the control device 220 performs control similar to absolute positional control on the second arm members 122 and 132 using the slits S and the incremental encoder 174.

The control of the lifting and lowering actuators 170 and 180 by the control device 220 can be applied in essentially the same manner as the control of the control device 48 in the detection device 4 of the fourth embodiment. In this case, the first unit 71 is provided with the first arm member 121, the second arm member 122, the first lifting and lowering mechanism 172, the rotary driving source 171, the incremental encoder 174, the dog 175, and the sensor 176, and the second unit 72 is provided with the first arm member 131, the second arm member 132, the first lifting and lowering mechanism 182, the rotary driving source 181, the incremental encoder 184, the dog 185, and the sensor 186.

In other words, the difference amount detection section 93 of the control device 220 detects the difference amount between the position of the one second arm member 122 and the position of the other second arm member 132. Specifically, in each of the first unit 71 and the second unit 72, in a case in which the moving members 12a and 12b move relative to the reference members 11a and 11b, and in a case in which the count value increase or decrease number of the first unit 71 is different from the count value increase or decrease number of the second unit 72, the difference amount detection section 93 detects that the relative position of the moving member 12a of the first unit 71 is different from the relative position of the moving member 12b of the second unit 72.

In a case in which the difference amount between the count values is greater than a predetermined value, the difference amount detection section 93 of the control device 220 determines that a large deviation arises between the second arm members 122 and 132. Meanwhile, in a case in which the difference amount between the count values is less than or equal to a predetermined value, the difference amount detection section 93 determines that deviation does not substantially arise between the second arm members 122 and 132.

6. Modification Example of Fifth Embodiment

The assistant robot 100 of the fifth embodiment applies the detection device 1 of the first to the fourth embodiments to the second arm members 122 and 132. In addition, it is possible to apply the detection device 1 of the first to the fourth embodiments to the forward and backward movement of the holding section 150 with respect to the lifting and lowering section 140.

7. Effects of Embodiments

The detection devices 1, 2, 3, and 4 of the first to the fourth embodiments are provided with the reference member 11, the moving member 12 which moves relative to the reference member 11, the incremental encoder 15 which increases or decreases the count value every time the moving member 12 moves relative to the reference member 11 by a predetermined amount, a driving source 14 which drives the relative movement between the reference member 11 and the moving member 12 based on the count value of the incremental encoder 15, a dog 16 which is disposed on one of the reference member 11 and the moving member 12 and which includes the multiple slits S, at least one of the separation distances between adjacent slits S and the widths of the slits S themselves is formed in multiple kinds, a sensor 17 which is disposed on the other of the reference member 11 and the moving member 12 and detects the presence or absence of the slits S, the count position acquisition section 30 which acquires the count start position Ps and the count end position Pe corresponding to the separation distance between the adjacent slits S and the widths of the slits S themselves based on the detection results of the sensor 17 in a case in which the moving member 12 moves relative to the reference member 11, and the state detection sections 40, 50, and 85 which acquire the count value increase or decrease number from the count start position Ps to the count end position Pe and detect the state of the moving member 12 based on the acquired count value increase or decrease number.

According to the detection devices 1, 2, 3, and 4, the dog 16 is provided with the multiple slits S, multiple kinds of the separation distances between the adjacent slits S are set, multiple kinds of the widths of the slits S themselves are set, or multiple kinds of both the separation distances between the adjacent slits S and the widths of the slits S themselves are set. Multiple kinds of the interval from the count start position Ps to the count end position Pe which are acquired by the count position acquisition section 30 are present. Therefore, the count value increase or decrease number which is acquired by the state detection sections 40, 50, and 85 is a number corresponding to multiple kinds of separation distance between the adjacent slits S, or, corresponding to the width between the slits S themselves. Therefore, it is possible to detect the state of the moving member 12 in a short time by the moving member 12 moving only a little with respect to the reference member 11.

In the detection devices 1, 2, and 3 of the first, second, and third embodiments, the count position acquisition section 30 may acquire the count start position Ps and the count end position Pe corresponding to the separation distances of the adjacent slits S, and the state detection sections 40 and 50 may store, in advance, the count number to positional relationship data in which the relationship between the count value increase or decrease number corresponding to the separation distance between the adjacent slits S and the relative position of the moving member 12 is set, acquire the count value increase or decrease number from the count start position Ps to the count end position Pe, and detect the current relative position of the moving member 12 based on the acquired count value increase or decrease number and the count number to positional relationship data. In this case, since multiple kinds of the separation distance between the adjacent slits S are set, it is possible to ascertain the current position of the moving member 12 using the detection results of the sensor 17. It is possible to detect the current position of the moving member 12 using a simple configuration.

In a case in which multiple kinds of the separation distance between the adjacent slits S are set, the space from the count start position Ps to the count end position Pe may include a portion in which the slits S are not present between the adjacent slits S. Accordingly, it is possible to reliably detect the current position of the moving member 12.

In the detection devices 1, 2, and 3 of the first, second, and third embodiments, the count position acquisition section 30 may acquire the count start position Ps and the count end position Pe corresponding to the separation widths of the slits S themselves, and the state detection sections 40 and 50 may store, in advance, the count number to positional relationship data in which the relationship between the count value increase or decrease number corresponding to the widths of the slits S themselves and the relative position of the moving member 12 is set, acquire the count value increase or decrease number from the count start position Ps to the count end position Pe, and detect the current relative position of the moving member 12 based on the acquired count value increase or decrease number and the count number to positional relationship data. In this case, since multiple kinds of the width between the slits S themselves are set, it is possible to ascertain the current position of the moving member 12 using the detection results of the sensor 17. It is possible to detect the current position of the moving member 12 using a simple configuration.

In the detection devices 1 and 3 of the first and the third embodiments, the driving source 14 is controlled based on the origin of the relative position of the moving member 12 and the count value, and the state detection section 40 sets the origin based on the current relative position of the moving member 12. In the origin setting, the operating amount of the moving member 12 may be short. Therefore, the origin setting is possible in a short time.

In the second embodiment, the state detection section 50 is provided with the current position detection section 43 which detects the current relative position of the moving member 12 based on the acquired count value increase or decrease number and the count number to positional relationship data, the control position calculation section 54 which calculates the current relative position of the moving member 12 based on an origin of the relative position of the moving member 12 and the cumulative count value of the incremental encoder 15 which is used in the control of the driving source 14, and the comparing section 55 which compares the current relative position of the moving member 12 which is detected by the current position detection section 43 and the current relative position of the moving member 12 which is calculated by the control position calculation section 54.

Since the control section 20 controls the driving source 14 based on the cumulative count value by the incremental encoder 15, the absolute position of the moving member 12 is not accurately ascertained. The control position of the moving member 12 may deviate from the actual position due to some circumstance. In such a case, it is possible to ascertain whether or not the control position deviates from the actual position due to the comparing section 55 comparing the control position and the current position which is detected by the current position detection section 43.

In the detection devices 1, 2, 3, and 4 of the first to the fourth embodiments, in a case in which multiple kinds of separation distances of the adjacent slits S are set, the separation distances of the adjacent slits S may increase toward one way in the relative movement direction of the moving member 12. In the detection devices 1, 2, 3, and 4 of the first to the fourth embodiments, in a case in which multiple kinds of widths of the slits S themselves are set, the widths of the slits S themselves may increase toward one way in the relative movement direction of the moving member 12. Accordingly, if it is possible to ascertain the positions of the slits S, the detection devices 1, 2, 3, and 4 are capable of reliably ascertaining the current relative position of the moving member 12.

The detection device 4 of the fourth embodiment is provided with the first unit 71 including the reference member 11a, the moving member 12a, the driving source 14a, the incremental encoder 15a, the dog 16a, and the sensor 17a, and the second unit 72 including the reference member 11b, the moving member 12b, the driving source 14b, the incremental encoder 15b, the dog 16b, and the sensor 17b. In the detection device 4, the driving source 14a of the first unit 71 and the driving source 14a of the second unit 72 are operated in synchronization. The count position acquisition sections 83 and 84 acquire the count start position Ps and the count end position Pe of each of the first unit 71 and the second unit 72 based on the detection results of the sensor 17a of the first unit 71 and the detection results of the sensor 17b of the second unit 72. The state detection section 85 acquires the count value increase or decrease number of each of the first unit 71 and the second unit 72 and detects the difference between the relative position of the moving member 12a of the first unit 71 and the relative position of the moving member 12b of the second unit 72 based on the acquired count value increase or decrease number of each of the first unit 71 and the second unit 72.

Generally, since the moving member 12a of the first unit 71 and the moving member 12b of the second unit 72 operate in synchronization, a difference in the positions does not arise. However, due to various circumstances, in a case in which one causes positional deviation, a difference arises in the positions of both. In such a case, since the state detection section 85 detects the difference between the relative position of the moving member 12a of the first unit 71 and the relative position of the moving member 12b of the second unit 72, the detection device 4 is capable of ascertaining that the positional deviation arises in both.

In the detection device 4 of the fourth embodiment, in each of the first unit 71 and the second unit 72, in a case in which the moving members 12a and 12b move relative to the reference members 11a and 11b, and in a case in which the count value increase or decrease number of the first unit 71 is different from the count value increase or decrease number of the second unit 72, the state detection section 85 detects that the relative position of the moving member 12a of the first unit 71 is different from the relative position of the moving member 12b of the second unit 72. Therefore, the state detection section 85 is capable of reliably determining whether or not there is positional deviation in both.

The assistant robot 100 of the fifth embodiment is provided with the base 110, the lifting and lowering section 140 which is lifted and lowered with respect to the base 110, the lifting and lowering arms 120 and 130 which connect the base 110 to the lifting and lowering section 140 and are configured by the multiple arm members 121, 122, 123, 131, 132, and 133 which move relatively, the holding section 150 which holds a portion of a body of the person in need of assistance M1 and is disposed on the lifting and lowering section 140, and any one of the detection devices 1, 2, 3, and 4 of the first to the fourth embodiments. The reference member 11 and the moving member 12 are the multiple arm members 121, 122, 131, and 132 which move relatively in the lifting and lowering arms 120 and 130.

The detection devices 1, 2, 3, and 4 are applied to the lifting and lowering arms 120 and 130 of the assistant robot 100. In other words, by applying the detection devices 1, 2, 3, and 4 to the relevant parts of the assistant robot 100 as appropriate, the assistant robot 100 is capable of easily detecting the height of the lifting and lowering section 140, is capable of performing the origin setting in a short time, and is capable of detecting the deviation of the control position from the actual position.

The assistant robot 100 of the fifth embodiment is provided with the base 110, the lifting and lowering section 140 which is lifted and lowered with respect to the base 110, the lifting and lowering arms 120 and 130 which connect the base 110 to the lifting and lowering section 140 and are configured by the multiple arm members 121, 122, 123, 131, 132, and 133 which move relatively, the holding section 150 which holds a portion of a body of the person in need of assistance M1 and is disposed on the lifting and lowering section 140, and the detection device 4 of the fourth embodiment.

The reference member 11a and the moving member 12a of the first unit 71 are the multiple arm members 121 and 122 which move relatively in the one lifting and lowering arm 120 and the reference member 11b and the moving member 12b of the second unit 72 are the multiple arm members 131 and 132 which move relatively in the other lifting and lowering arm 130.

In this case, the assistant robot 100 is capable of reliably detecting the positional deviation of the lifting and lowering arms 120 and 130. In the assistant robot 100, the lifting and lowering arms 120 and 130 may operate due to a simplification in the configuration, a reduction in the size, or the like of the apparatus. In such a case, this configuration is extremely effective.

The assistant robot 100 of the modification example of the fifth embodiment is provided with the base 110, the lifting and lowering section 140 which is lifted and lowered with respect to the base 110, the lifting and lowering arms 120 and 130 which connect the base 110 to the lifting and lowering section 140, the holding section 150 which holds a portion of a body of the person in need of assistance M1 and moves forward and backward with respect to the lifting and lowering section 140, and any one of the detection devices 1, 2, 3, and 4 of the first to the fourth embodiments. The reference member 11 and the moving member 12 are the lifting and lowering section 140 and the holding section 150.

The detection devices 1, 2, 3, and 4 are applied to the parts which move forward and backward of the holding section 150 of the assistant robot 100. In other words, by applying the detection devices 1, 2, 3, and 4 to the relevant parts of the assistant robot 100 as appropriate, the assistant robot 100 is capable of easily detecting the front-back position of the holding section 150, is capable of performing the origin setting in a short time, and it capable of detecting the deviation of the control position from the actual position.

REFERENCE SIGNS LIST 1, 2, 3, 4: detection device, 11, 11a, 11b: reference member, 12, 12a, 12b: moving member, 13, 13a, 13b: driving mechanism, 13_1: screw section, 13_2: nut section, 14, 14a, 14b: driving source, 15, 15a, 15b: incremental encoder, 16, 16a, 16b: dog, 17, 17a, 17b: sensor, 18, 28, 38, 48: control device, 20, 60, 81, 82: control section, 30, 83, 84: count position acquisition section, 40, 50, 85: state detection section, 41, 91, 92: count value increase or decrease number acquisition section, 42, 52: count value to positional relationship data memory section, 43: current position detection section, 44: origin setting section, 54: control position calculation section, 55: comparing section, 71: first unit, 72: second unit, 93: difference amount detection section, 100: assistant robot, 110: base, 120, 130: lifting and lowering arm, 140: lifting and lowering section, 150: holding section, 170, 180: lifting and lowering actuator, 171, 181: rotary driving source, 172, 182: first lifting and lowering mechanism, 172a, 182a: screw axis, 172b, 182b: nut member, 173, 183: second lifting and lowering mechanism, 174, 184: incremental encoder, 175, 185: dog, 176, 186: sensor, 190, 200: forward-and-backward movement actuator, 191: supported member, 192: rotary driving source, 193: screw axis, 194: nut member, 220: control device, M1: person in need of assistance

The invention claimed is:

1. A detection device comprising:
    a reference member;
    a moving member which moves relative to the reference member;
    an incremental encoder which increases or decreases a count value each time the moving member moves relative to the reference member by a predetermined amount;
    a driving source which drives relative movement between the reference member and the moving member based on the count value of the incremental encoder;
    a dog which is disposed on one of the reference member and the moving member and which includes multiple slits, in which at least one of a separation distance between adjacent slits and a width of the slits themselves varies;
    a sensor which is disposed on the other of the reference member and the moving member and detects presence or absence of the slits;
    a count position acquisition section which acquires a count start position and a count end position corresponding to the separation distance between the adjacent slits or the width of the slits themselves based on detection results of the sensor in a case in which the moving member moves relative to the reference member; and
    a state detection section which acquires the count value increase or decrease number from the count start position to the count end position and detects the state of the moving member based on the acquired count value increase or decrease number.

2. The detection device according to claim 1,
    wherein the count position acquisition section acquires the count start position and the count end position corresponding to the separation distance between the adjacent slits, and
    wherein the state detection section stores, in advance, count number to positional relationship data in which a relationship between the count value increase or decrease number corresponding to the separation distance between the adjacent slits and a relative position of the moving member is set, acquires the count value increase or decrease number from the count start position to the count end position, and detects a current relative position of the moving member based on the acquired count value increase or decrease number and the count number to positional relationship data.

3. The detection device according to claim 1,
    wherein the count position acquisition section acquires the count start position and the count end position corresponding to the width of the slits themselves, and
    wherein the state detection section stores, in advance, count number to positional relationship data in which a relationship between the count value increase or decrease number corresponding to the width of the slits themselves and a relative position of the moving member is set, acquires the count value increase or decrease number from the count start position to the count end position, and detects thea current relative position of the moving member based on the acquired count value increase or decrease number and the count number to positional relationship data.

4. The detection device according to claim 2,
wherein the driving source is controlled based on an origin of the relative position of the moving member and the count value, and
wherein the state detection section sets the origin based on the current relative position of the moving member.

5. The detection device according to claim 2,
wherein the state detection section includes
a current position detection section which detects the current relative position of the moving member based on the acquired count value increase or decrease number and the count number to positional relationship data,
a control position calculation section which calculates the current relative position of the moving member based on an origin of the relative position of the moving member and a cumulative count value of the incremental encoder which is used in the control of the driving source, and
a comparing section which compares the current relative position of the moving member which is detected by the current position detection section and the current relative position of the moving member which is calculated by the control position calculation section.

6. The detection device according to claim 1, further comprising:
a first unit including the reference member, the moving member, the driving source, the incremental encoder, the dog, and the sensor; and
a second unit including the reference member, the moving member, the driving source, the incremental encoder, the dog, and the sensor,
wherein the driving source of the first unit and the driving source of the second unit operate in synchronization,
wherein the count position acquisition section acquires the count start position and the count end position of each of the first unit and the second unit based on detection results of the sensor of the first unit and the sensor of the second unit, and
wherein the state detection section acquires the count value increase or decrease number of each of the first unit and the second unit and detects a difference between the relative position of the moving member of the first unit and the relative position of the moving member of the second unit based on the acquired count value increase or decrease number of each of the first unit and the second unit.

7. The detection device according to claim 6,
wherein in each of the first unit and the second unit, in a case in which the moving members move relative to the reference members, and in a case in which the count value increase or decrease number of the first unit is different from the count value increase or decrease number of the second unit, the state detection section detects that the relative position of the moving member of the first unit is different from the relative position of the moving member of the second unit.

* * * * *